(12) United States Patent
Ihara et al.

(10) Patent No.: US 6,954,696 B2
(45) Date of Patent: Oct. 11, 2005

(54) NAVIGATION DEVICE, MAP DISPLAYING METHOD AND IMAGE DISPLAY DEVICE

(75) Inventors: Koji Ihara, Chiba (JP); Atsushi Kuribayashi, Kanagawa (JP); Tatsuya Yamamoto, Chiba (JP); Hitomi Sahara, Tokyo (JP); Takeshi Tsukada, Kanagawa (JP); Yoshinori Watanabe, Aichi (JP)

(73) Assignees: Sony Corporation, Tokyo (JP); Denso Corporation, Aichi (JP)

( * ) Notice: Subject to any disclaimer, the term of this patent is extended or adjusted under 35 U.S.C. 154(b) by 268 days.

(21) Appl. No.: 10/229,463

(22) Filed: Aug. 28, 2002

(65) Prior Publication Data

US 2003/0069689 A1 Apr. 10, 2003

(30) Foreign Application Priority Data

Sep. 4, 2001 (JP) ..................................... P2001-268106

(51) Int. Cl.[7] ............................................. G01C 21/00
(52) U.S. Cl. ...................... 701/208; 701/212; 340/990; 340/995
(58) Field of Search ............................... 701/208, 212, 701/211, 200, 209; 340/990, 995, 988; 382/278, 284; 707/104.1

(56) References Cited

U.S. PATENT DOCUMENTS

| | | | | |
|---|---|---|---|---|
| 4,675,676 A | | 6/1987 | Takanabe et al. ........... 340/995 |
| 5,359,526 A | * | 10/1994 | Whittington et al. ....... 701/200 |
| 5,731,979 A | | 3/1998 | Yano et al. ............... 364/449.5 |
| 5,948,040 A | * | 9/1999 | DeLorme et al. ........... 701/201 |
| 6,178,380 B1 | | 1/2001 | Millington ................. 701/212 |
| 6,182,010 B1 | * | 1/2001 | Berstis ...................... 701/211 |
| 6,313,837 B1 | * | 11/2001 | Assa et al. ................. 345/420 |
| 6,470,265 B1 | * | 10/2002 | Tanaka ....................... 701/208 |
| 6,490,002 B1 | * | 12/2002 | Shintani ..................... 348/569 |
| 6,633,608 B1 | * | 10/2003 | Miller .................... 375/240.02 |

FOREIGN PATENT DOCUMENTS

| | | | |
|---|---|---|---|
| JP | 7270172 | 10/1995 | ........... G01C/21/00 |
| JP | 9081895 | 3/1997 | ......... G08G/1/0969 |

* cited by examiner

*Primary Examiner*—Thomas G. Black
*Assistant Examiner*—Arthur D. Donnelly
(74) *Attorney, Agent, or Firm*—Jay H. Maioli

(57) ABSTRACT

A navigation device simultaneously displays two screens of maps on a common display unit and includes a map data storage unit for storing map data and a resolution conversion unit for converting the resolution of the map data acquired from the map data storage unit. The display unit has a predetermined display area for displaying a map based on the map data with its resolution having been converted.

6 Claims, 11 Drawing Sheets

| POLYGON DATA P | PLOTTING COORDINATE Pm OF PRIMARY SCREEN | PLOTTING COORDINATE Ps OF SECONDARY SCREEN |
|---|---|---|
| P (Xp, Yp) | Pm (Xm, Ym) | Ps (OffsetX+Xm/Rr, OffsetY+Ym/Rr) |
| P1(60, 30) | Pm1(60, 30) | Ps1 (OffsetX+60/3, OffsetY+30/3) |
| P2 (30, 150) | Pm2 (30, 150) | Ps2 (OffsetX+30/3, OffsetY+150/3) |
| P3 (150, 120) | Pm3 (150, 120) | Ps3 (OffsetX+150/3, OffsetY+120/3) |

NAVIGATION DEVICE, MAP DISPLAYING METHOD AND IMAGE DISPLAY DEVICE

BACKGROUND OF THE INVENTION

1. Field of the Invention

This invention relates to a navigation device, a map displaying method and an image display device with excellent operability.

2. Description of the Related Art

Recently, navigation devices which can find their own positions and traveling speeds in real time by using GPS (Global Positioning System) satellites orbiting up in the skies have been becoming popularized for being carried on a mobile unit such as an automobile or for portable use.

In a navigation device, a map based on electronic map data is displayed on its monitor. Particularly, a navigation device for being carried on a mobile unit has a function to guide in a traveling direction based on a route set by a user.

When setting a route, the user designates at least a starting point and a destination. Then, the navigation device searches for and generates an optimum route connecting the designated starting point and destination, and presents it to the user as a recommended route. The user can also arbitrarily designate a place where the user wants to visit before reaching the destination, or a landmark for traveling such as an intersection, interchange or ramp, as an en route spot. In this case, it is possible to designate a plurality of places as en route spots. When en route spots are thus designated by the user, the navigation device searches for an optimum route connecting the starting point, one or more en route spots and the destination.

Even when the user does not designate any particular en route spot, the navigation device can present a point located between the starting point and the destination as an en route spot when presenting a recommended route to the user. Thus, the user can grasp the way and an image of a guide point before leaving.

Moreover, in Japan, VICS (Vehicle Information and Communication System) has been becoming popularized as a system for providing real time traffic information such as traffic congestion, accidents, traffic control and parking lots by using beacon signs (information communication facilities) installed on the roads or FM (frequency modulation) multiplex broadcasting. A navigation device equipped with a unit for receiving such VICS information can display information of traffic obstruction and congestion due to traffic control and accidents on the basis of the VICS information, in the form of teletext information or graphic information on its monitor. This provides traffic congestion information corresponding to the traveling direction of the vehicle, that is, the recommended route, and therefore the user can properly get not only the traffic congestion information related to the road on which the user is currently traveling, but also the traffic congestion information with respect to the en route spot and the vicinity of the destination.

As described above, the navigation device provide various information which is highly convenient to the user. This information is based on map information. Maps displayed on the navigation device can be classified into detailed map and wide-area map. The maps can be displayed by a one-screen display technique for displaying one map on one screen, or by a two-screen display technique for displaying two maps on one screen.

FIG. 1 shows an example of the one-screen display of the detailed map. The one-screen display of the detailed map is effective for accurately identifying an intersection where the vehicle is to turn, or for recognizing the form of the road on which the vehicle is currently traveling. However, the one-screen display only provides information of an area relatively close to the vehicle and therefore it is not convenient for seeing the traveling route to the destination.

FIG. 2 shows an example of the one-screen display of the wide-area map. The one-screen display of the wide-area map is effective for recognizing the traveling route to the destination. However, the user may not accurately recognize an intersection where the vehicle is to turn. In short, the one-screen display of the detailed map and the one-screen display of the wide-area map have opposite advantages and drawbacks.

Thus, as shown in FIG. 3, the two-screen display technique is employed in which the detailed map and the wide-area map are displayed in parallel on a display screen. The two-screen display technique is proposed to provide map information having the advantages of both the detailed map and the wide-area map. However, it has not yet achieved desired effects for the following reason.

Specifically, since each of the maps displayed by the two-screen display technique only displays a part of a map which would be displayed by the one-screen display technique, the detailed map and the wide-area map cover only narrow areas, respectively. Therefore, the quantity of information provided by each map is smaller than that of the one-screen display. The advantages of the detailed map and the wide-area map cannot be exhibited sufficiently and the position of the vehicle carrying the navigation device may not be grasped accurately.

SUMMARY OF THE INVENTION

Thus, it is an object of this invention to provide a navigation device which can effectively display the detailed map and the wide-area map even in the case of the two-screen display. It is another object of this invention to provide a map displaying method suitable for such a navigation device.

As described above, since each of the maps displayed by the conventional two-screen display technique only displays a part of a map which would be displayed by the one-screen display technique, the detailed map and the wide-area map cover only narrow areas. Thus, according to this invention, the resolution of map data is lowered in order to enable the two-screen display technique to display an entire map which would be displayed by the one-screen display technique. Therefore, this invention provides a navigation device comprising a map data storage unit for storing map data, and a resolution conversion unit for converting the resolution of the map data acquired from the map data storage unit. The navigation device also has a display unit having a predetermined display area for displaying a map based on the map data with its resolution converted.

Since the navigation device of this invention has the resolution conversion unit for converting the resolution of map data, the display unit can simultaneously display a first map based on the map data with its resolution converted and a second map based on another map data acquired from the map data storage unit. For example, the first map has its resolution lowered and is reduced in size, but it can display the same area as before the conversion. Therefore, a new two-screen display method can be provided which has both functions of the detailed map and the wide-area map, unlike the conventional two-screen display, in which maps are displayed only partially.

In the navigation device of this invention, the display unit can display the second map to fill the predetermined display area and can display the first map over a part of the second map. That is, in the navigation device of this invention, the second map is displayed as a primary screen and the first map is displayed as a secondary screen in the primary screen. In this navigation device, it is desired that the display unit displays the first map at a position which is on the second map and does not interfere with the traveling route of the vehicle carrying the navigation device as a navigation object. This is to prevent the position of the vehicle carrying the navigation device from being concealed under the first map.

In the navigation device of this invention, a detailed map can be displayed as the first map and a wide-area map can be displayed as the second map. The detailed map and the wide-area map include a common area but have different scales. Therefore, in the navigation device of this invention, the display unit can display the second map including an area coincident with the first map and having a different scale.

This invention also provides the following map displaying method which can be applied to the above-described navigation device. That is, the map displaying method of this invention is adapted for a map display device having a predetermined display area and comprises a step of displaying a second map with predetermined resolution, and a step of displaying a first map with lower resolution than the predetermined resolution on the second map.

According to the map displaying method of this invention, two maps with different resolution are displayed within the same display area. The first map displayed on the second map has its resolution lowered but maintains geographical information which it had before the resolution is lowered. Therefore, the function proper to the first map can be fulfilled.

In the map displaying method of this invention, it is desired to display the first map at a part on the second map, with substantially the same aspect ratio as the predetermined display area. In this case, assuming that the second map is displayed to fill the predetermined display area, the first map and the second map are displayed with substantially the same aspect ratio. This is preferable for the visibility to the user.

In the map displaying method of this invention, the resolution of the first map and the resolution of the second map can be switched so that the second map can be displayed on the first map. For example, a wide-area map which was displayed as the secondary screen on a detailed map as the primary screen may be changed to the primary screen, and the detailed map may be displayed as the secondary screen on the wide-area map.

The application of this invention is not limited to the navigation device. That is, this invention also provides an image display device comprising display means for displaying an image, and display control means for causing the display means to display a first image and a second image which include correlated information and have different resolution in such a manner that the second image is displayed in a predetermined area on the first image.

The image display device of this invention displays the first image and the second image which include correlated information. The correlated information may be information containing information common to the two images. For example, the relation between a detailed map and a wide-area map applies to this. Moreover, the information of one of the images may complement the information of the other. For example, the relation between a wide-area map and VICS traffic information applies to this. These examples are of maps in order to facilitate understanding, but these examples may also be applied to image information other than maps.

In this invention, it is preferred that at least one of the first image and the second image presents a map.

Thus, this invention provides a navigation device which can display a detailed map and a wide-area map so that the functions of these maps are fulfilled even in the case of the two-screen display.

DESCRIPTION OF THE PREFERRED EMBODIMENTS

A preferred embodiment of this invention will now be described in detail with reference to the attached drawings.

Figure 4:
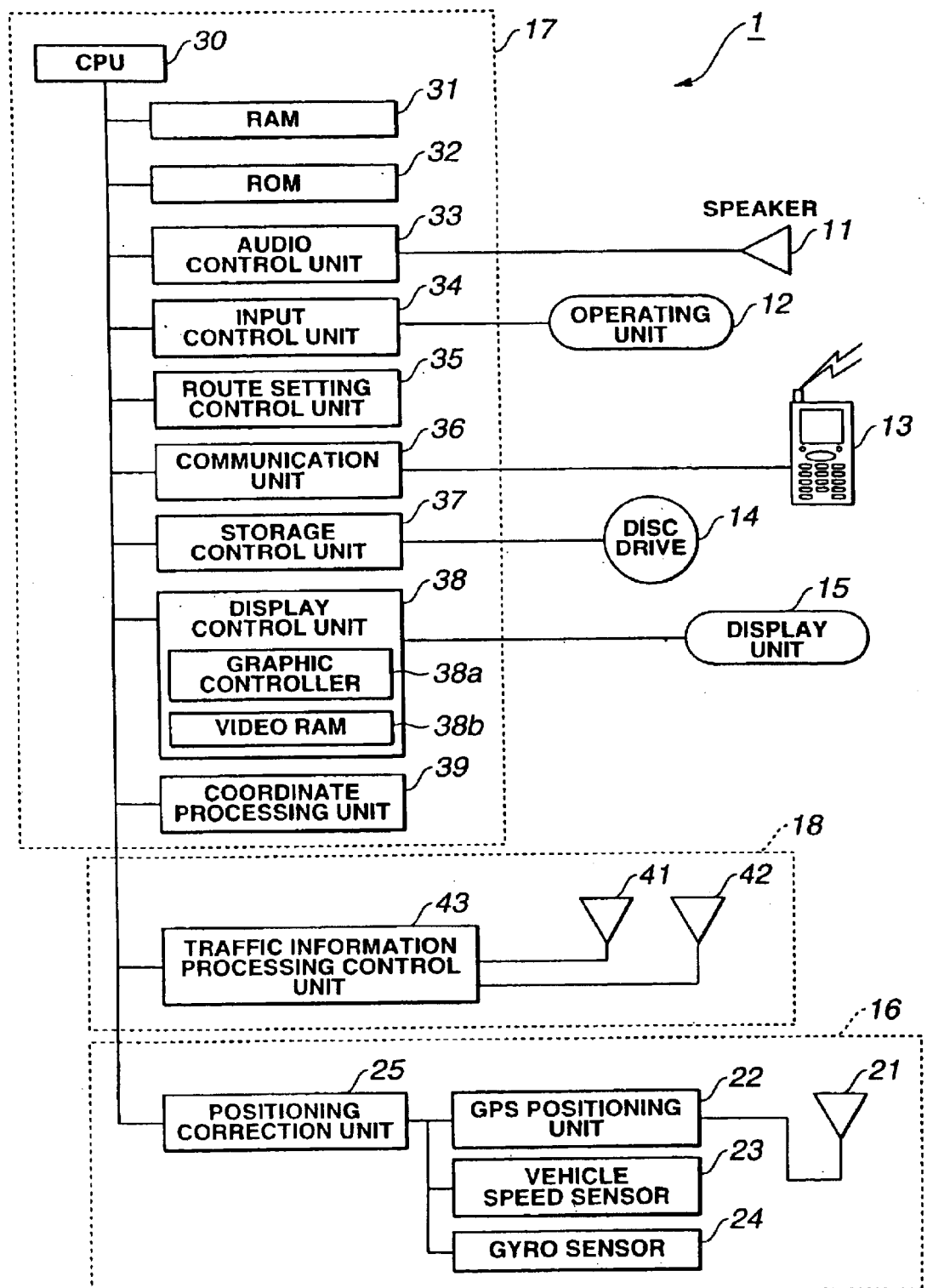
FIG. 4 shows the structure of a navigation device of an embodiment of this invention.

FIG. 4 is a block diagram for explaining the overall structure of a navigation device (image display device) 1 of this embodiment.

As shown in FIG. 4, the navigation device 1 of this embodiment has the following constituent elements: a speaker 11 for outputting guidance sounds; an operating unit 12 including a remote controller and a control panel; a communication terminal 13 as communication means for connecting to the Internet or the like; a disc drive 14 for carrying a recording disc (map data storage unit) such as CD-ROM (compact disc read-only memory) or DVD-ROM (digital versatile disc read-only memory) on which map data of a predetermined wide area is stored; a display unit (display means) 15 made up of a monitor such as a liquid crystal display for displaying a map image or the like; a positioning block 16 for positioning its vehicle; a control block 17 for controlling the entire device; and a traffic information receiving block 18 for receiving traffic information of traffic congestion, accidents, traffic control, parking lots and the like.

A plurality of types of map data having different scales for the same area are stored on the recording disc. Moreover, node data about nodes (places) and search data based on the names of institutions are stored on the recording disc in association with the map data.

The positioning block 16 has the following units: a GPS antenna 21 for receiving signals sent from GPS satellites; a GPS positioning unit 22 for positioning based on the signals obtained from the GPS antenna 21; a vehicle speed sensor 23 for detecting the speed of the vehicle carrying the navigation device 1; a gyro sensor 24 for detecting the rotational displacement of the vehicle; and a positioning correction unit 25 for correcting the result of positioning by the GPS positioning unit 22 on the basis of the detection values obtained by the vehicle speed sensor 23 and the gyro sensor 24.

The control block 17 has the following units: a CPU 30 for carrying out control of the entire system and arithmetic processing; a RAM 31 as a internal storage made up of a DRAM (dynamic random access memory); a ROM 32 in which a predetermined program for actuating the navigation device 1 is stored; an audio control unit 33 for controlling a sound outputted from the speaker 11; an input control unit 34 for controlling an input signal from the operating unit 12; a route setting control unit 35 for calculating a recommended route on the basis of a starting point, an en route spot and a destination set by a user; a communication unit 36 for communicating with the Internet or the like by using the communication terminal 13 such as a removably mounted portable telephone terminal or a portable information terminal like a PDA (personal digital assistant); and a storage control unit 37 for controlling the disc drive 14 and the like.

When the user carries out a predetermined operation by using the operating unit 12, the input control unit 34 accepts designation of a place for which a map should be displayed. When the user selects a current screen, that is, an active screen in the state where a plurality of screens are displayed on the display unit 15, the input control unit 34 can switch the current screen in response to the user's selection.

The traffic information receiving block 18 has an FM multiplex receiver 41, a beacon receiver 42, and a traffic information processing control unit 43.

The FM multiplex receiver 41 receives an FM multiplex broadcast wave including data of traffic information by using an FM antenna and demodulates this FM multiplex broadcast wave, thus outputting data of multiplexed traffic information.

The beacon receiver 42 receives a signal including data of traffic information from a radio wave (or light) beacon generator by using a beacon antenna and demodulates the signal, thus acquiring and outputting data of traffic information.

The traffic information processing control unit 43 processes the data of traffic information such as traffic conges-tion information received by the FM multiplex receiver 41 and the beacon receiver 42, that is, so-called VICS information, and stores the data of traffic information received by the FM multiplex receiver 41 and the beacon receiver 42 to the RAM 31.

Figure 3:
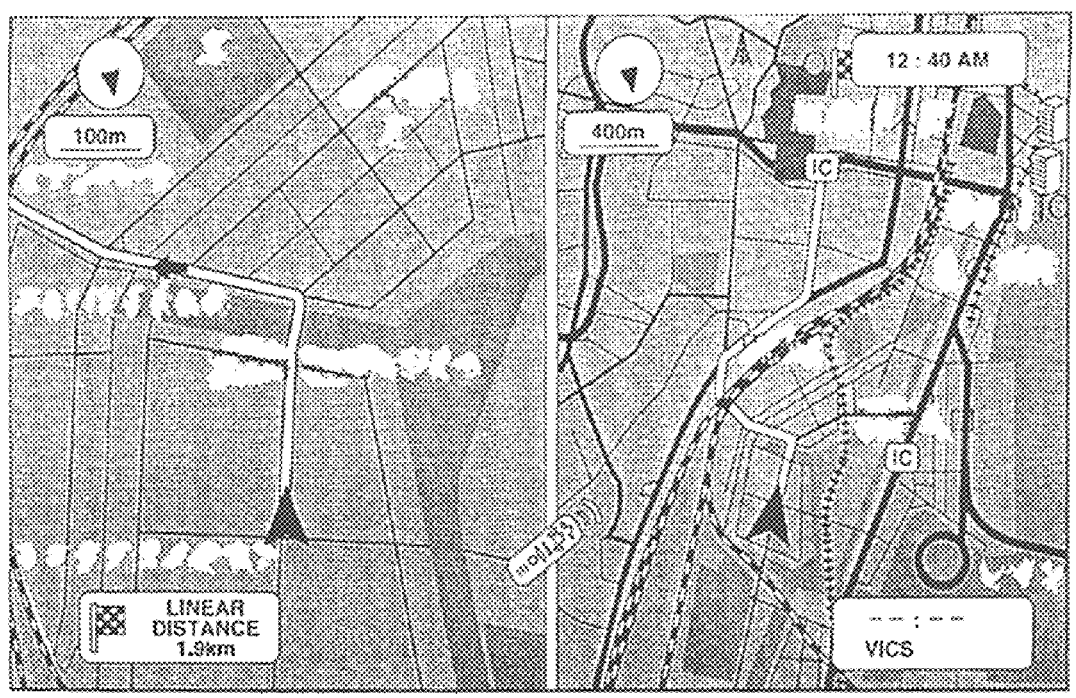
FIG. 3 shows an exemplary display of a detailed map and a wide-area map by the conventional two-screen display technique.

In the navigation device 1 of this embodiment, for example, a detailed map and a wide-area map can be simultaneously displayed on the display unit 15. That is, the navigation device 1 can perform two-screen display. However, it is different from the conventional two-screen display in which a detailed map and a wide-area map are arranged in parallel, as described with reference to FIG. 3. The navigation device 1 can carry out two-screen display which is different from the conventional technique such that on a primary screen displayed in the entire display area of the display unit 15, a secondary screen having different resolution from that of the primary screen is displayed.

Figure 1:
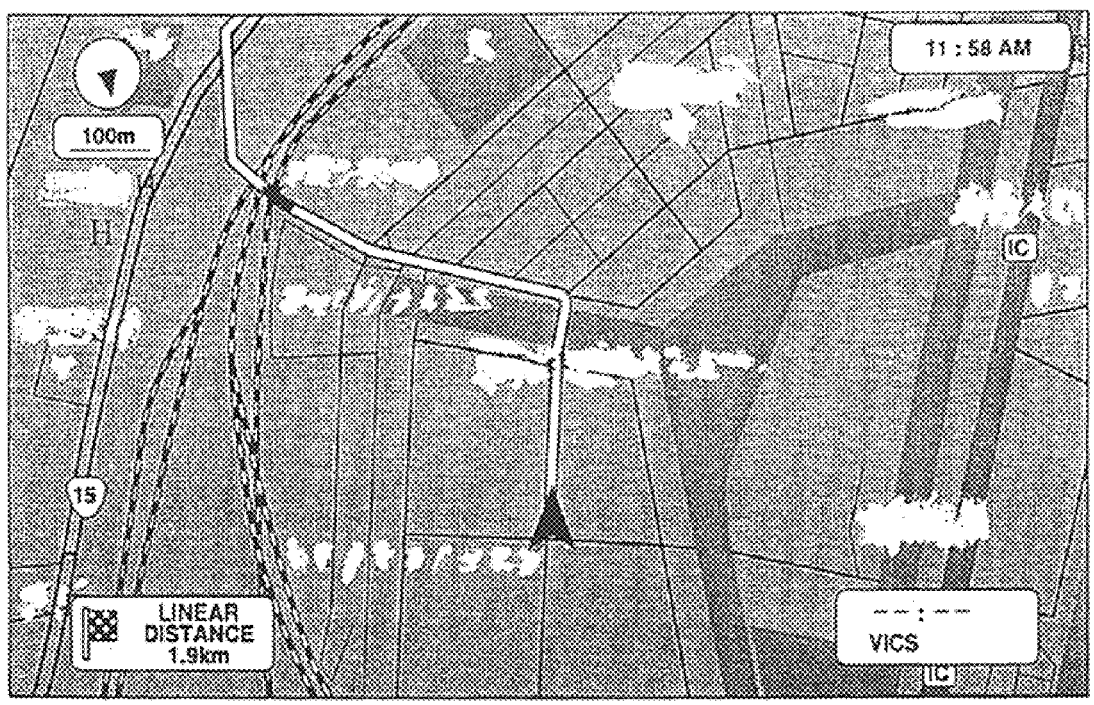
FIG. 1 shows an exemplary display of a detailed map by the conventional one-screen display technique.
Figure 2:
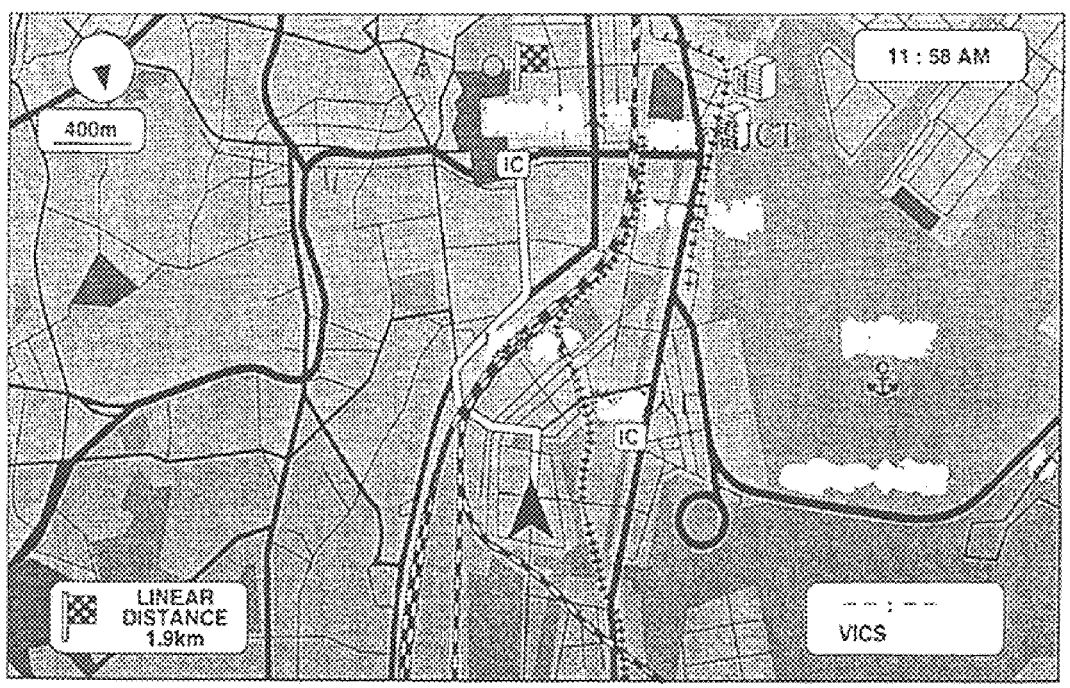
FIG. 2 shows an exemplary display of a wide-area map by the conventional one-screen display technique.
Figure 5:
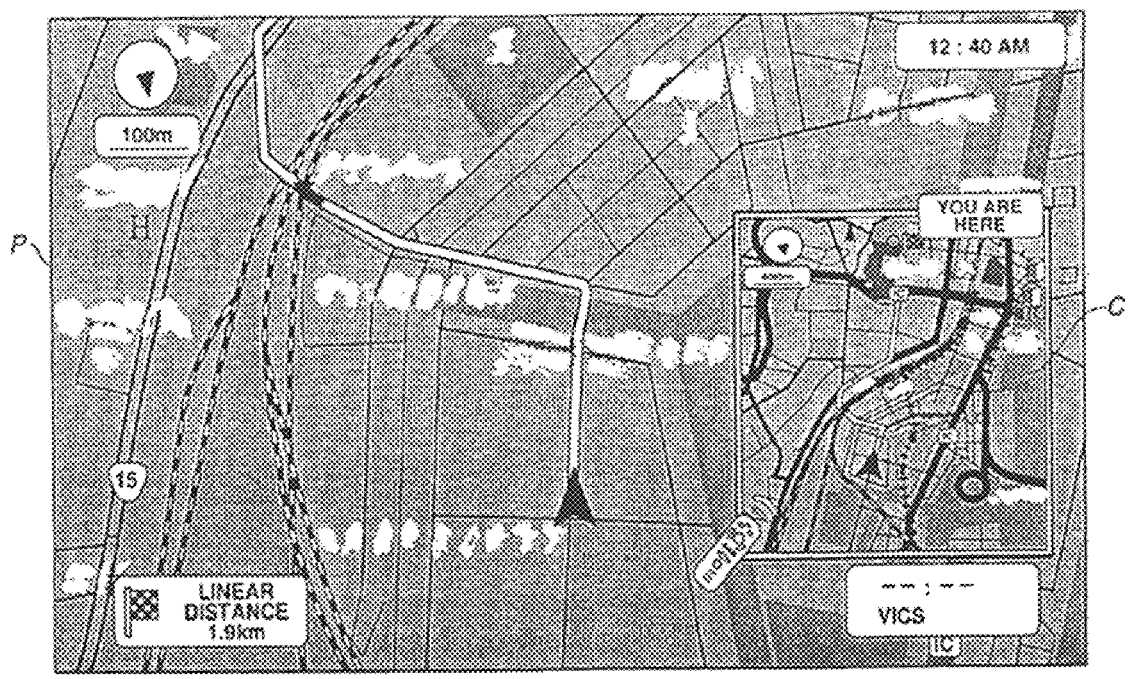
FIG. 5 shows an example in which a wide-area map is displayed as a primary screen while a detailed map is displayed as a secondary screen in the navigation device of the embodiment of this invention.

An example of this display is shown in FIG. 5. In FIG. 5, a detailed map is displayed as a primary screen P and a wide-area map is displayed as a secondary screen C. The detailed map displayed as the primary screen P is an image having the same resolution as in the one-screen display of FIG. 1. That is, the primary screen P of this embodiment follows the conventional one-screen display. On the other hand, the secondary screen C presents a map of a content corresponding to the map shown in FIG. 2 with its resolution lowered. Therefore, the wide-area map presented in the secondary screen C has the same quantity of information as the map presented by the one-screen display. Therefore, the area of the displayed map is the same as the map presented by the one-screen display and can achieve the advantage of the wide-area view.

Hereinafter, a resolution conversion technique will be described with reference to FIGS. 6 and 7.

Figures 6, 7:
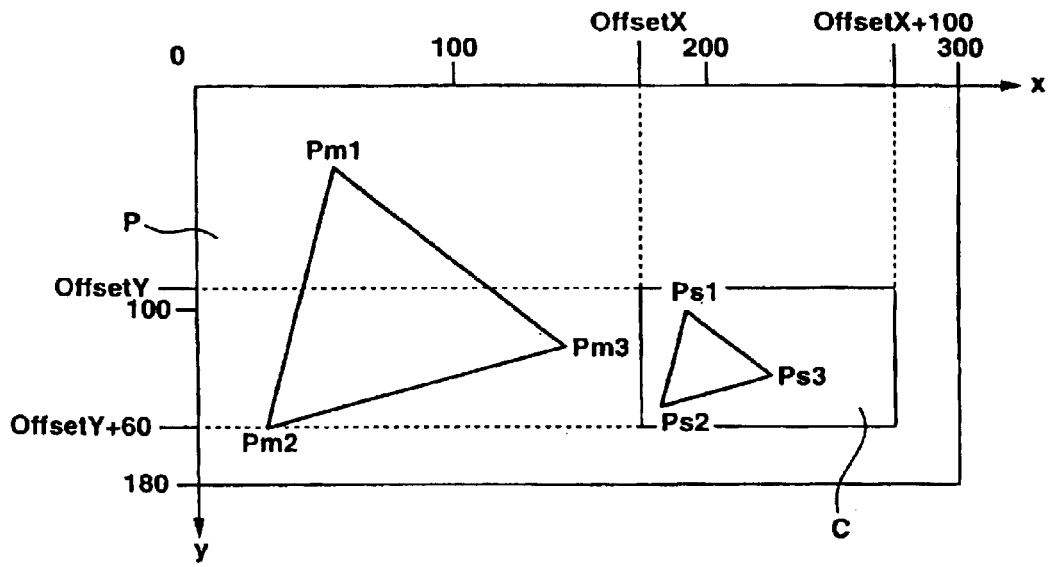
FIG. 6 is a view for explaining the principle of resolution conversion in the navigation device of the embodiment of this invention.
FIG. 7 is a table showing coordinate data of FIG. 6.

The coordinate system of the display unit 15 is set in such a manner that the x-axis is set rightward and the y-axis is set downward from the upper left corner of the display unit 15 as the origin, as shown in FIG. 6. The size of the display unit 15 in the direction of the x-axis is set to 300 and its size in the direction of the y-axis is set to 180. The area of the primary screen is (0, 0) to (300, 180). The area of the secondary screen is (OffsetX, OffsetY) to (OffsetX+100, OffsetY+60).

For example, polygon data as map data may be constituted by three points P1(60, 30), P2(30, 150) and P3(150, 120). When plotting the map based on this polygon data on the primary screen, no resolution conversion is carried out. Therefore, a polygon having three vertices Pm1(60, 30), Pm2(30, 150) and Pm3(150, 120) is plotted on the primary screen.

When plotting the same map on the secondary screen, resolution conversion and coordinate transformation from the vertex coordinate of the polygon on the primary screen to the vertex coordinate on the secondary screen are required. If the ratio of the resolution of the primary screen to that of the secondary screen (size of primary screen/size of secondary screen) is represented by Rr and the vertex coordinate on the primary screen is represented by (Xm, Ym), the transformation to the vertex coordinate (Xs, Ys) on the secondary screen is expressed by the following equation (1).

$$Xs = \text{Offset}X + Xm/Rr, \quad Ys = \text{Offset}Y + Ym/Rr \qquad (1)$$

The vertex coordinate Ps1, Ps2 and Ps3 in the secondary screen, obtained by transforming the polygon data Pm1(60, 30), Pm2(30, 150) and Pm3(150, 120) in accordance with the equation (1), is shown in FIG. 7. The result of plotting is shown in FIG. 6.

The above-described coordinate transformation and resolution conversion processing is carried out by a coordinate processing unit 39. The coordinate processing unit 39 reads out map data from a video RAM 38b of a display control unit 38 in accordance with an instruction from the user and carries out coordinate transformation and resolution conversion in accordance with the equation (1). The map data, on which coordinate transformation and resolution conversion were performed, is provided to the video RAM 38b of the display control unit 38.

The display control unit 38 has a graphic controller 38a and the video RAM 38b. The graphic controller 38a expands and stores image data such as a map read out from the disc driver 14 and the RAM 31, to the video RAM 38b. The graphic controller 38a also expands and stores the map data processed by the coordinate processing unit 39 to the video RAM 38b. Moreover, the graphic controller 38a causes the display unit 15 to display the image data such as a map stored in the video RAM 38b. The image data includes the map data processed by the coordinate processing unit 39.

The map plotting procedure in the navigation device 1, constituted as described above, will now be described with reference to the flowchart of FIG. 8.

Figure 8:
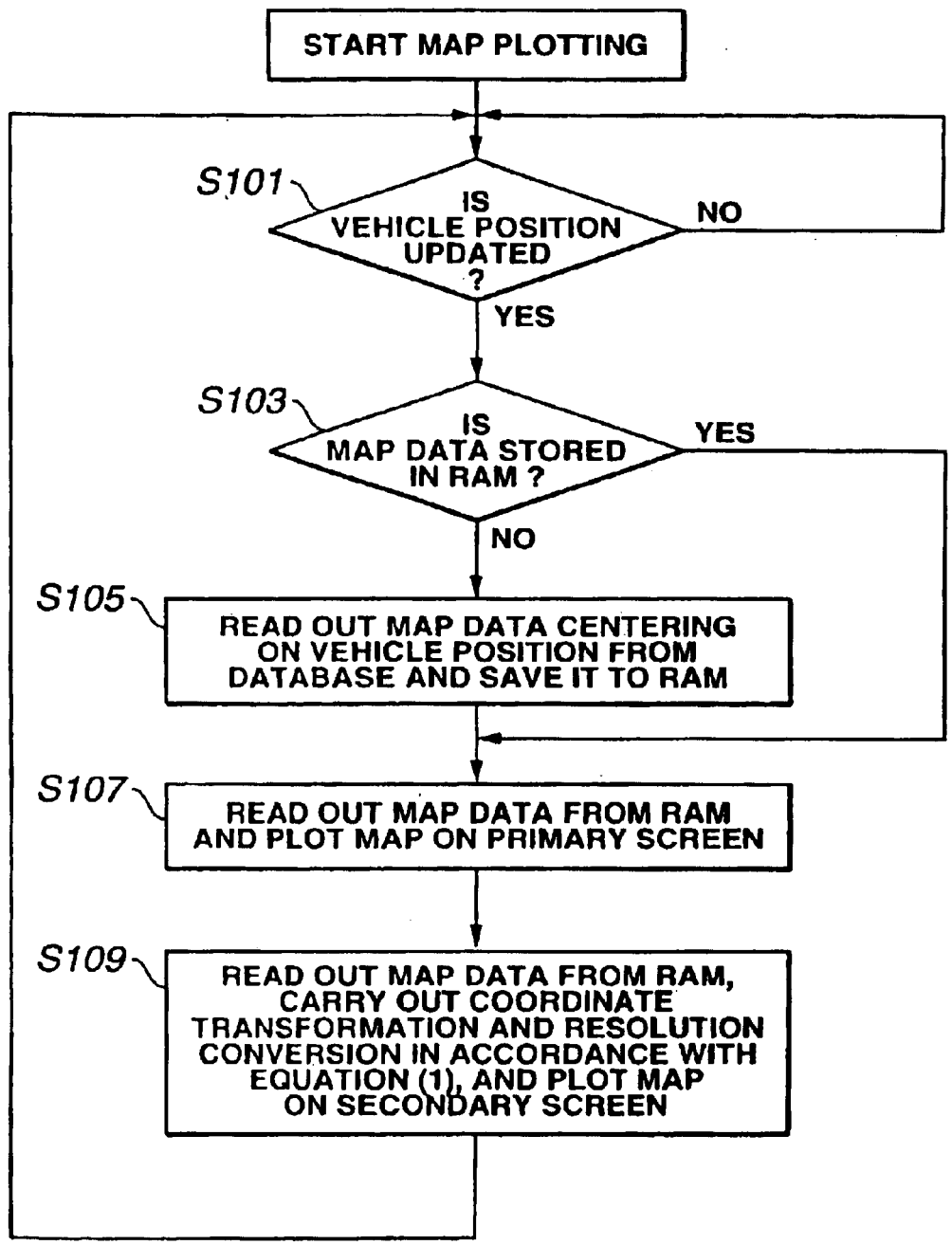
FIG. 8 is a flowchart showing the map plotting procedure in the navigation device of the embodiment of this invention.

In FIG. 8, the CPU 30 detects information about the update of the position of the vehicle carrying the navigation device from the positioning block 16 (step S101). The update of the position of the vehicle carrying the navigation device is an event which triggers re-plotting of the map displayed on the display unit 15. Therefore, though the update of the vehicle carrying the navigation device is detected in this case, another event which triggers re-plotting of the map may be detected.

As the update of the vehicle carrying the navigation device is detected, the CPU 30 determines whether the map data is saved in the RAM 31 or not (step S103 of FIG. 8). If the map data is not yet saved, the map data recorded on the recording disc loaded on the disc drive 14 is read out and saved to the RAM 31 (step S105 of FIG. 8). The reading and saving of the map data is carried out by the CPU 30. The map data includes first map data for plotting on the primary screen and second map data for plotting on the secondary screen.

Next, the CPU 30 reads out the first map data of the map data saved in the RAM 31 and plots the first map data to the video RAM 38b by using the graphic controller 38a (step S107 of FIG. 8). This plotting is carried out on the primary screen P.

After the plotting on the primary screen P ends, the CPU 30 reads out the second map data from the RAM 31. The CPU 30 sends the second map data thus read out, to the coordinate processing unit 39. The coordinate processing unit 39 carries out coordinate transformation and resolution conversion in accordance with the above-described equation (1). On the basis of the coordinate data on which coordinate transformation and resolution conversion were carried out, the CPU 30 plots the second map data to the video RAM 38b by using the graphic controller 39a, thus executing plotting based on the second map data on the secondary screen C(step S109 of FIG. 8). The display in the display area of the display unit 15 is carried out as the graphic controller 39a transfers the data of the video RAM 38b to the display unit 15 at predetermined timing.

An exemplary screen displayed in accordance with the above-described procedure is shown in FIG. 5. As described above, FIG. 5 shows a detailed map on the primary screen P and a wide-area map on the secondary screen C. The resolution of the wide-area map displayed on the secondary screen C has been converted in accordance with the equation (1). That is, in FIG. 5, on the detailed map displayed as the primary screen P, the wide-area map having different resolution from the detailed map is displayed. This wide-area map maintains the same quantity of information as in the one-screen display. Therefore, it shows the same area as in the one-screen display and can achieve the advantage of the wide-area map. Thus, by carrying out map display as shown in FIG. 5, the user of the navigation device 1 can grasp the traveling route from the wide-area map display on the secondary screen C while accurately recognizing the next intersection where the user is to turn, from the detailed map displayed on the primary screen P.

In the display shown in FIG. 5, the display position of the secondary screen C is well considered. Normally, the navigation device 1 is set so that the vehicle carrying the navigation device looks traveling upward on the display unit 15. Moreover, the vehicle carrying the navigation device is arranged substantially at the center in the direction of width of the display unit 15. Therefore, all the information of the map displayed in the one screen on the display unit 15 may not be necessary to the user. For example, in the example of FIG. 5, the secondary screen C is displayed on the right side of the vehicle M carrying the navigation device, and the traveling route of the vehicle does not interfere with that area. That is, the secondary screen C is arranged at a position where it will not obstruct the use of the detailed map of the navigation device 1 displayed on the primary screen P.

In the example of FIG. 5, the secondary screen C is arranged on the right side of the vehicle M carrying the navigation device. However, the secondary screen C may also be arranged on the left side of the vehicle M because it will not obstruct the user of the detailed map of the navigation device 1. Normally, the navigation device 1 is arranged at the center in the direction of width of the automobile. Therefore, for a driver of a right-hand drive car, the secondary screen C with low resolution arranged on the right side on the display unit 15 is easier to recognize than the secondary screen arranged on the left side. Particularly, since the secondary screen C has low resolution, the secondary screen C on the right side on the display unit 15 may be more visible to the driver.

The example of displaying a detailed map on the primary screen P and a wide-area map on the secondary screen C is described above. The navigation device 1 of this invention may also realize other display methods. Hereinafter, several exemplary displays which are different from that of FIG. 5 will be described.

Figure 9:
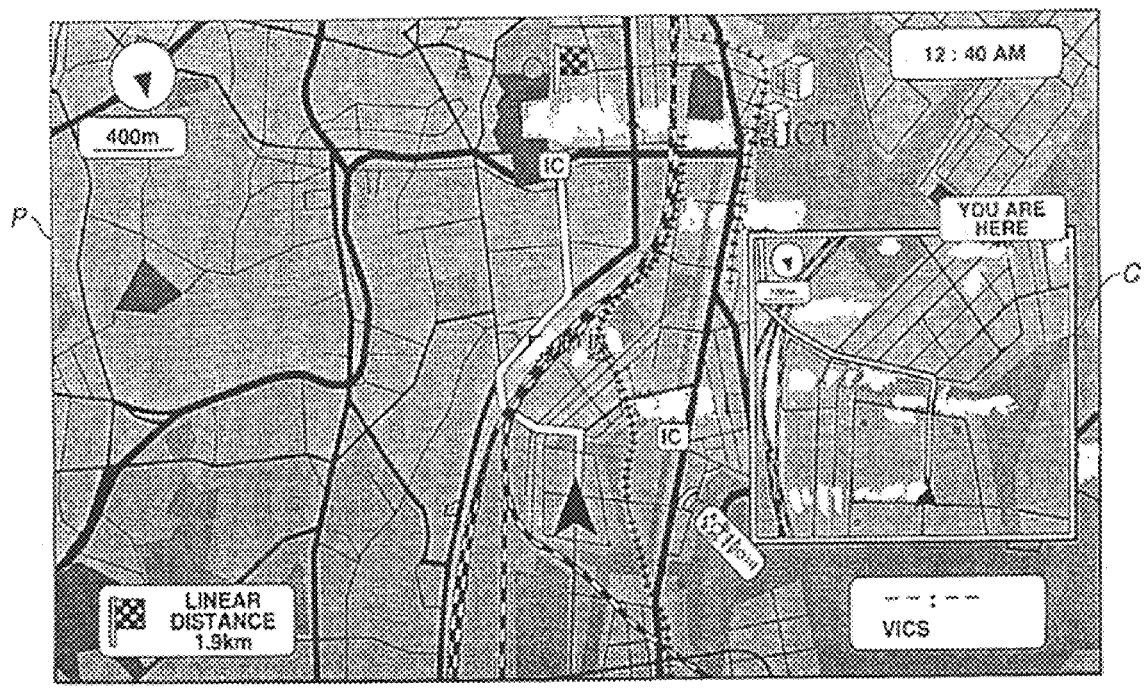
FIG. 9 shows an example in which a detailed map is displayed as the primary screen while a wide-area map is displayed as the secondary screen in the navigation device of the embodiment of this invention.

FIG. 9 shows an example of displaying a wide-area map on the primary screen P and a detailed map on the secondary screen C. In this exemplary display, contrary to the exemplary display of FIG. 5, a wide-area map is first displayed on the primary screen. After that, coordinate transformation and resolution conversion of map data about a detailed map are carried out and the detailed map is displayed on the secondary screen C on the basis of the transformed map data. In FIG. 9, since the wide-area map is displayed on the primary screen P, the user can securely recognize the traveling route. Moreover, the detailed map, though having low resolution, is displayed on the secondary screen C, and therefore the user can sufficiently recognize the next intersection where the user is to turn. This display aims mainly at making no mistakes about the traveling route and therefore is useful for traveling a new road.

For example, the display may be switched from the two-screen display of FIG. 9 for displaying the wide-area map on the primary screen P and the detailed map on the secondary screen C to the two-screen display of FIG. 5 for displaying the detailed map on the primary screen P and the wide-area map on the secondary screen C. When switching the display from the two-screen display of FIG. 9 to the two-screen display of FIG. 5, first, the map data corresponding to the detailed map stored in the RAM 31 is read out and plotted on the primary screen P. Then, the map data corresponding to the wide-area map stored in the RAM 31 is read out and coordinate transformation and resolution conversion based on the equation (1) is carried out by the coordinate processing unit 39. The wide-area map is plotted on the secondary screen C on the basis of the transformed map data.

Figure 10:
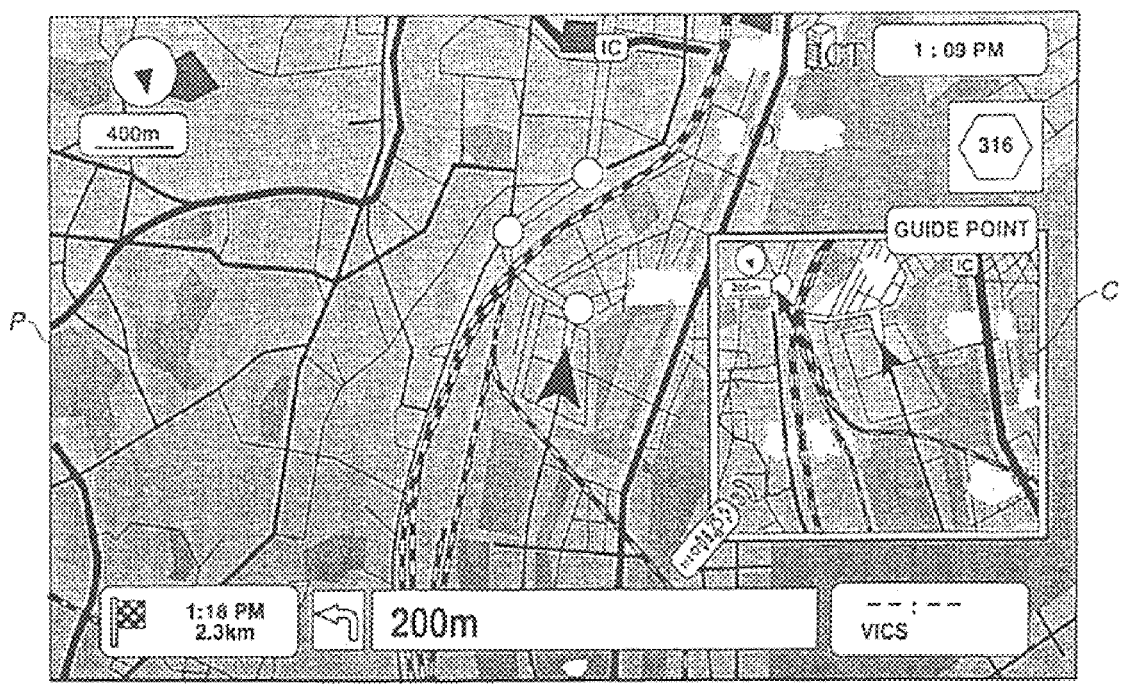
FIG. 10 shows an example in which a detailed map is displayed as the primary screen while a guide point map is displayed as the secondary screen in the navigation device of the embodiment of this invention.
Figure 11:
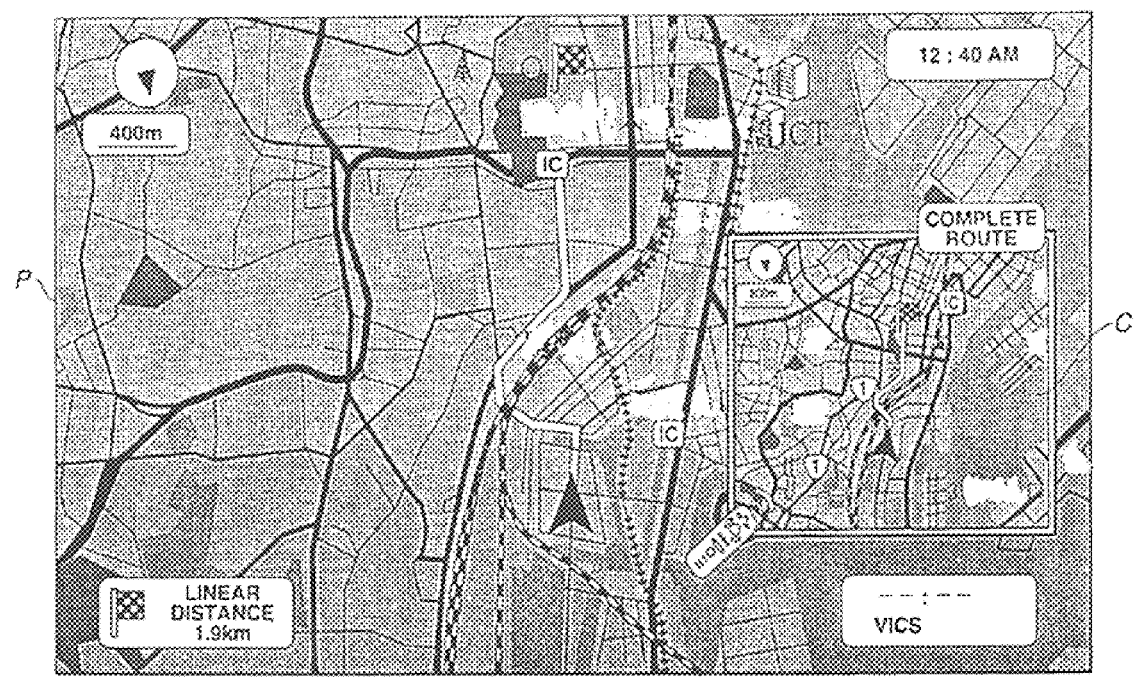
FIG. 11 shows an example in which a wide-area map is displayed as the primary screen while a complete route guide map is displayed as the secondary screen in the navigation device of the embodiment of this invention.
Figure 12:
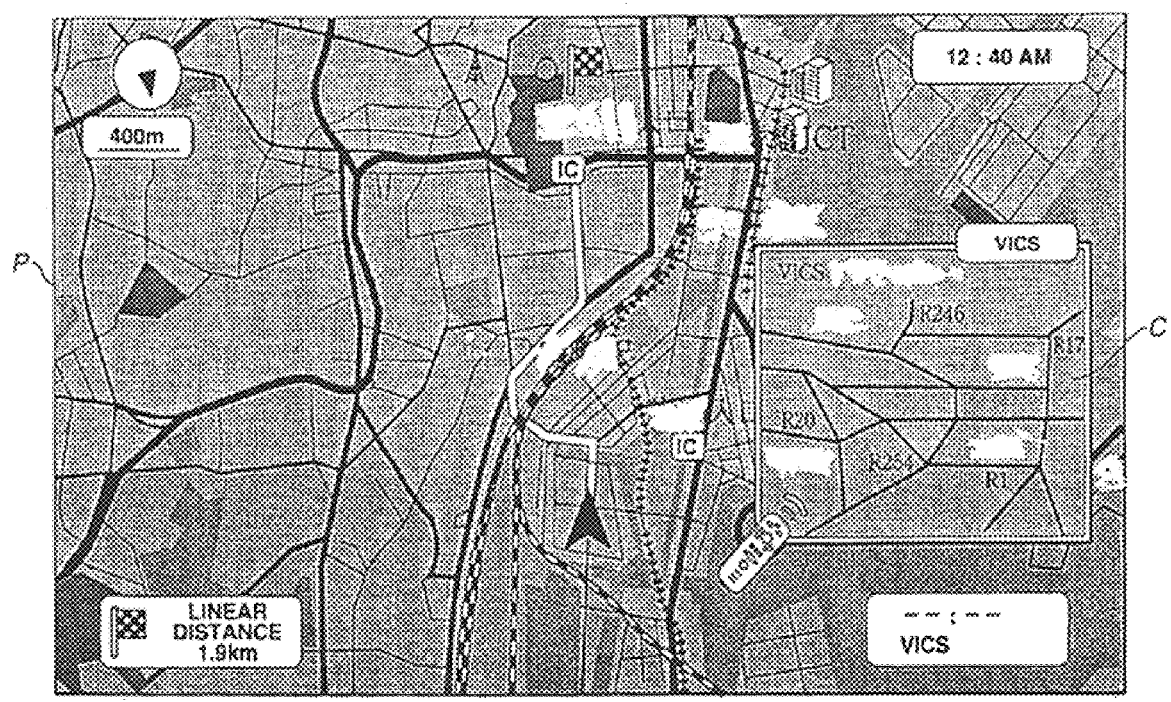
FIG. 12 shows an example in which a wide-area map is displayed as the primary screen while VICS information is displayed as the secondary screen in the navigation device of the embodiment of this invention.

Alternatively, a map showing a guide point may be displayed on the secondary screen C, for example, as shown in FIG. 10. Moreover, the entire route which was searched for by the user may be displayed as a complete route on the secondary screen C, as shown in FIG. 11. Furthermore, VICS information may be displayed on the secondary screen C, as shown in FIG. 12. Of course, the guide point information, the complete route information and the VICS information displayed on the secondary screen C may also be displayed on the primary screen P. In that case, a genuine map such as a wide-area map or a detailed map may be displayed on the secondary screen C.

This invention is proposed to cope with the problem of the conventional two-screen display that the function of the detailed map or the wide-area map cannot be sufficiently achieved because of the reduction in the range of the displayed map. Therefore, fundamentally, an object to be displayed on the secondary screen C should be a map. However, information which is not a genuine map and which has its value lowered by reducing the quantity of information from the information displayed in the area corresponding to the one-screen display may be an object to be displayed on the secondary screen C. For example, a list of interchanges of freeways, that is, characters, may be displayed on the secondary screen C. In this manner, this invention is effective for displaying arbitrary but correlated information on the primary screen P and the secondary screen C. In this invention, it is desired to display a map at least on one of the primary and secondary screens and display other information on the other screen which can be combined with the map to provide added value to the information provided by the map. The other information which can provide added value may include maps as well as characters, photographs and other information.

In the above-described embodiment, this invention is applied to the navigation device 1. However, the application object of this invention is not limited to the navigation device 1 and may also be a PDA including a display device, or other terminals.

In the above-described embodiment, the secondary screen C of FIG. 5 carries out screen display with the same quantity of information as in the one-screen display. However, since the secondary screen C has a narrow display range and hence a small screen size, it might give an impression such that roads are displayed more densely or characters are overlapped, compared with the one-screen display.

Thus, by omitting narrow roads or some types of roads such as municipal roads and less important roads, or by omitting or reducing the size of characters of less importance (for example, names of apartment buildings), the appearance can be improved.

On the contrary, in the case where facilities or marks registered by the user are to be more visible, the visibility may be improved by enlarging such marks or limiting their sizes.

With respect to marks which are important to the driver, such as facilities or marks registered by the user, the display with reduced resolution might lower the visibility.

In that case, the visibility can be secured by displaying the marks with resolution equivalent to that of the one-screen display or with resolution which is intermediate between the resolution of the one-screen display and the resolution of the secondary screen C.

What is claimed is:

1. A navigation device comprising:
    a map data storage unit for storing first map data of a first map having a predetermined resolution and for storing second map data of a second map having a predetermined resolution;
    a resolution conversion unit for selectively converting the resolution of the first map data and the second map data acquired from the map data storage unit; and
    a display unit having a predetermined display area for displaying two maps simultaneously, a smaller map superimposed on a larger map occupying the entire predetermined display area,
    wherein said display unit displays one of said first map and said second map over said predetermined display area entirely and the other of said first map and second map is resolution converted by said resolution concession unit and superimposed on a portion of said predetermined display area, whereby both said first map and second map are simultaneously displayed with one of said first map and said second map being converted in resolution.

2. The navigation device as claimed in claim 1, wherein the display unit displays the one of the first map and the second map at a position on the second map that does not interfere with a traveling route of a vehicle carrying the navigation device as a navigation object.

3. A map displaying method in a map display device having a predetermined display area, the method comprising the steps of:
    storing first map data of a first map having a predetermined resolution and storing second map data of a second map having a predetermined resolution;
    selectively converting a resolution of one of the first map and the second map; and
    displaying two maps simultaneously, with a smaller map superimposed on a larger map occupying the entire predetermined display area,
    wherein the step of displaying includes displaying one of the first map and the second map over the entire predetermined display area and superimposing the other of the first map and the second map on a portion of the predetermined display area after performing the step of selectively converting a resolution thereof, thereby simultaneously displaying both the first map and the second map, with one of the first map and the second map being converted in resolution.

4. The map displaying method as claimed in claim 3, further comprising a step of interchanging the resolution of the first map and the resolution of the second map and displaying the second map on the first map.

5. An image display device comprising:
    display means having a predetermined display area for displaying an image;

resolution conversion means for converting a resolution of an image fed thereto and producing a converted resolution image; and display control means for causing the display means to display a first image and a converted resolution second image from said resolution conversion means that include correlated information and have different respective resolutions in such a manner that the second image is displayed on a portion of the first image that occupies the entire predetermined display area.

6. The image display device as claimed in claim 5, wherein at least one of the first image and the second image presents a map.

* * * * *